(12) United States Patent
Brand et al.

(10) Patent No.: US 9,248,759 B2
(45) Date of Patent: *Feb. 2, 2016

(54) VEHICLE CREWSTATION SEAT ASSEMBLY

(71) Applicant: Bell Helicopter Textron Inc., Fort Worth, TX (US)

(72) Inventors: Albert G. Brand, North Richland Hills, TX (US); John R. Wittmaak, Newark, TX (US); James M. McCollough, Arlington, TX (US); James H. Harse, Bedford, TX (US); Richard H. Adams, Jr., Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,675

(22) Filed: Sep. 26, 2014

(65) Prior Publication Data

US 2015/0015039 A1    Jan. 15, 2015

Related U.S. Application Data

(63) Continuation of application No. 13/360,461, filed on Jan. 27, 2012, now Pat. No. 8,857,763.

(51) Int. Cl.
*B64D 11/06* (2006.01)
*B60N 2/06* (2006.01)
(Continued)

(52) U.S. Cl.
CPC ............ *B60N 2/0745* (2013.01); *B60N 2/01* (2013.01); *B60N 2/04* (2013.01); *B60N 2/0702* (2013.01);
(Continued)

(58) Field of Classification Search
CPC ...... B64D 11/06; B64D 11/0696; B60N 2/01; B60N 2/04; B60N 2/06; B60N 2/07; B60N 2/14
USPC .......... 244/118.5, 118.6, 122 R; 297/138, 143
See application file for complete search history.

(56) References Cited

U.S. PATENT DOCUMENTS 2,618,312 A    11/1952 Bradley
4,160,534 A *   7/1979 White ...................... 244/135 A
(Continued)

FOREIGN PATENT DOCUMENTS

AU            568482 B2     1/1988

OTHER PUBLICATIONS

European Search Report for related EP Application No. 12157272.1, Aug. 28, 2012, 6 pages, European Patent Office.
(Continued)

*Primary Examiner* — Christopher P Ellis
*Assistant Examiner* — Michael Wang
(74) *Attorney, Agent, or Firm* — Klemchuk LLP; Kirby B. Drake

(57) ABSTRACT

A movable seat assembly for a vehicle comprises a predetermined path having an operational location at a first end and an ingress/egress location at a second end, and a seat that travels along the predetermined path between the operational location and the ingress/egress location, wherein the seat has an operational orientation at the operational location and an ingress/egress seat orientation at the ingress/egress location; the ingress/egress seat orientation being substantially angled relative to the operational seat orientation. Another moveable seat assembly for a vehicle comprises a predetermined path having an operational location at a first end, an ingress/egress location at a second end, and a standby location along the path there between; and a seat that travels along the predetermined path between the operational location, the standby location, and the ingress/egress location; wherein the position of the seat is adjustable at the operational location. Another moveable seat assembly for a vehicle comprises a seat coupled to and moveable along at least one track defining a predetermined path between an operational location and an ingress/egress location.

21 Claims, 10 Drawing Sheets

(51) Int. Cl.
  *B60N 2/14* (2006.01)
  *B60N 2/07* (2006.01)
  *B64D 43/00* (2006.01)
  *B60N 2/075* (2006.01)
  *B60N 2/08* (2006.01)
  *B60N 2/24* (2006.01)
  *B60N 2/01* (2006.01)
  *B60N 2/04* (2006.01)

(52) U.S. Cl.
  CPC *B60N 2/075* (2013.01); *B60N 2/08* (2013.01); *B60N 2/0875* (2013.01); *B60N 2/14* (2013.01); *B60N 2/24* (2013.01); *B64D 11/0689* (2013.01); *B64D 11/0696* (2013.01); *B64D 43/00* (2013.01)

(56) References Cited

U.S. PATENT DOCUMENTS

| | | | | |
|---|---|---|---|---|
| 4,184,656 A | * | 1/1980 | Wakeley | 244/118.6 |
| 4,840,000 A | * | 6/1989 | Grines | 52/36.1 |
| 5,028,016 A | * | 7/1991 | Kelvin et al. | 244/122 R |
| 5,248,176 A | * | 9/1993 | Fredriksson | 294/215 |
| 6,027,170 A | * | 2/2000 | Benz et al. | 297/344.21 |
| 7,036,883 B1 | * | 5/2006 | Thompson et al. | 297/344.24 |
| 8,231,097 B2 | * | 7/2012 | Pinkal | 248/429 |
| 8,292,221 B2 | * | 10/2012 | Kennedy et al. | 244/118.1 |
| 8,398,023 B2 | * | 3/2013 | N nez et al. | 244/122 R |
| 2011/0062286 A1 | | 3/2011 | Pinkal | |
| 2011/0109114 A1 | | 5/2011 | Kolpasky et al. | |

OTHER PUBLICATIONS

Office Action for related Canadian Patent Application No. 2,803,554, Apr. 14, 2014, 2 pages, Canadian Intellectual Property Office.

Office Action for related EP Application No. 12157272.1, Sep. 17, 2015, 4 pages, European Patent Office.

Office Action and Search Report for related Chinese Application No. 201310032995.5, 12 pages, Chinese Patent Office.

English Translation of Search Report for related Chinese Application No. 201310032995.5, 2 pages, Chinese Patent Office.

* cited by examiner

VEHICLE CREWSTATION SEAT ASSEMBLY

CROSS-REFERENCE TO RELATED APPLICATIONS

This application claims priority to, and is a continuation of, U.S. Non-Provisional patent application Ser. No. 13/360,461 entitled "VEHICLE CREWSTATION SEAT ASSEMBLY" filed on Jan. 27, 2012, which is hereby incorporated by reference for all purposes.

FIELD OF THE DISCLOSURE

The present disclosure generally relates to vehicle crewstation seat assemblies, and more particularly, to moveable crewstation seat assemblies that facilitate ingress to and egress from a vehicle crewstation.

BACKGROUND

Vehicle crewstations may feature compact, intuitive and efficient crewstation layouts. Control interfaces, instruments, and other key system interfaces may be packaged tightly around a crewmember when seated in an operational location to reduce the crewmember's physical strain and improve accessibility to vehicle systems interfaces during operations. Conventional crewstation seats may move a short distance translationally in a forward, backward, and/or lateral direction to accommodate crewmember ingress and egress. However, design compromises may be necessary to address ingress and egress considerations and may inhibit optimal crewstation layouts.

SUMMARY

Embodiments of the present disclosure generally provide moveable seat assemblies for a vehicle and methods for positioning moveable seat assemblies within a vehicle between an ingress/egress position and an operational position along a predetermined path.

The present disclosure is directed to a movable seat assembly for a vehicle comprising a predetermined path having an operational location at a first end and an ingress/egress location at a second end, and a seat that travels along the predetermined path between the operational location and the ingress/egress location, wherein the seat has an operational orientation at the operational location and an ingress/egress seat orientation at the ingress/egress location; the ingress/egress seat orientation being substantially angled relative to the operational seat orientation. In an embodiment, the seat may travel along a separate adjustment path.

In another aspect, the present disclosure is directed to a moveable seat assembly for a vehicle comprising a predetermined path having an operational location at a first end, an ingress/egress location at a second end, and a standby location along the path there between; and a seat that travels along the predetermined path between the operational location, the standby location, and the ingress/egress location, wherein the position of the seat is adjustable at the operational location. In an embodiment, the moveable seat assembly further comprises a travel assistance mechanism to assist in translating the seat between the operational location, the standby location, and the ingress/egress location.

In yet another aspect, the present disclosure is directed to a moveable seat assembly for a vehicle comprising a seat coupled to and moveable along at least one track defining a predetermined path between an operational location and an ingress/egress location. In an embodiment, the seat is reoriented during translation along a curved portion of a first track of the at least one track. The seat may further maintain an orientation that is tangential to the first track during translation of the seat along the predetermined path defined by the first track. In various embodiments, the seat may be coupled to the first track by a limited rotation type coupler or by a plurality of free orientation type couplers.

In another embodiment, the seat may be rotationally reoriented about a pivot point during translation along a curved portion of the at least one track. The pivot point may be located on a first substantially straight track, and the seat may be slideably coupled to the first substantially straight track. In an embodiment, the seat is slidably coupled to a pivot mechanism located at the pivot point, and the pivot mechanism may be a pivot glide.

The seat may further be coupled to at least one seat rail. In an embodiment, the first seat rail is slidably coupled to a pivot mechanism located at the pivot point, and a second seat rail is slidably coupled to the at least one track. The pivot mechanism may be a pivot glide. In an embodiment, the second seat rail is slidably coupled to the at least one track by a glide-type coupler. The position of the seat may be slidably adjustable on the at least one seat rail.

In an embodiment, the moveable seat assembly further comprises a seat retention system to lock the seat into a position and orientation along the predetermined path. In an embodiment, the seat retention system may be selectively operated from a seated position, a location next to the seat, or a location behind the seat.

In an embodiment, the moveable seat assembly further comprises a travel assistance mechanism to assist in translating the seat along the predetermined path. The travel assistance mechanism may be selected from the group consisting of: a spring-type mechanism, an electric mechanism, a hydraulic mechanism, a pneumatic mechanism, a magnetic mechanism, an electro-hydraulic mechanism, an electro-pneumatic mechanism, or an electro-magnetic mechanism.

In another aspect, the present disclosure is directed to a method for positioning a vehicle crewstation seat within a vehicle. The method may comprise positioning the seat in an ingress/egress position and orientation, and translating the seat along a predetermined path between the ingress/egress position and orientation and an operational position and orientation, wherein the ingress/egress seat orientation is substantially angled relative to the operational seat orientation. The method may further comprise selectively retaining the seat in the operational position and orientation. In an embodiment, the translating step comprises electrically moving the seat along the predetermined path.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 5B depicts a bottom view of the moveable seat assembly and track of

FIG. 5A according to an embodiment of the present disclosure;

DETAILED DESCRIPTION

Figure 1A:
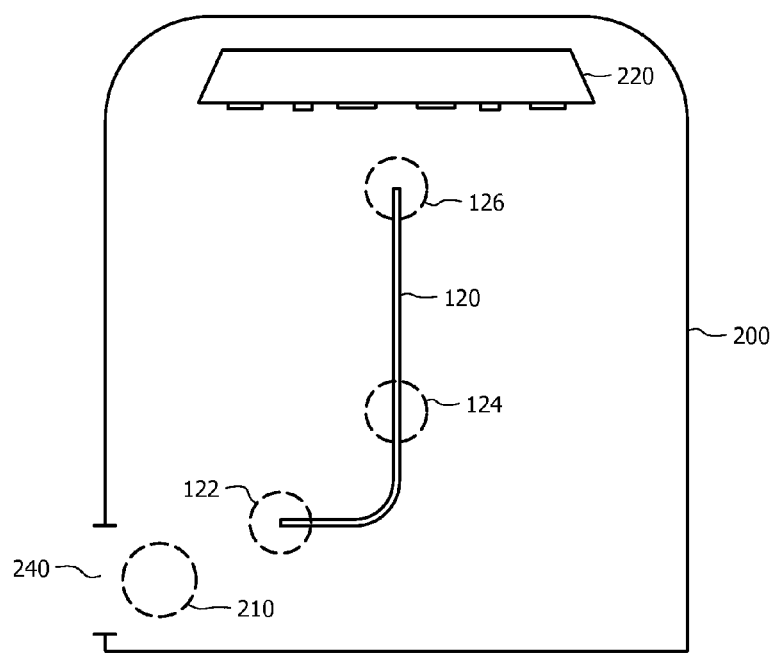
FIG. 1A depicts a top schematic view of a moveable seat assembly disposed within a vehicle crewstation, with a left side access point according to an embodiment of the present disclosure.

Embodiments of the present disclosure generally provide a moveable seat assembly that facilitates ingress to and egress from a vehicle crewstation. As described herein, the moveable seat assembly is moveable along a predetermined path, such as between an ingress/egress location proximate a crewstation access point and an operational location proximate vehicle controls. In various embodiments, the predetermined path may comprise substantially straight and curved portions, and the moveable seat assembly may have various rotational orientations as it moves translationally along the predetermined path.

FIGS. 1A-7 illustrate representative configurations of moveable seat assembly 100 and parts thereof. It should be understood that the components of moveable seat assembly 100 and parts thereof shown in FIGS. 1A-7 are for illustrative purposes only, and that any other suitable components or subcomponents may be used in conjunction with or in lieu of the components comprising moveable seat assembly 100 and the parts of moveable seat assembly 100 described herein.

Moveable seat assembly 100 according to the present disclosure may be integrated into a variety of vehicle crewstations 200 including, but not limited to, those of aircraft, rotorcraft, automobiles, trains, boats, and submersible/semisubmersible vessels, as well as vehicle simulators. Vehicle crewstation layouts vary considerably. Most comprise an arrangement of seats, vehicle controls, instruments, control panels, displays, and associated structure. Features are generally arranged in front of, beside, and/or above an operator in order to be substantially accessible during vehicle operation. For example, automobile controls like a steering wheel, brake pedal, gas pedal, and gear shifter, as well as instruments such as a speedometer, tachometer, and fuel gauge, are typically arranged proximate to and generally in alignment with an operator's hands, feet, and field of vision when operating the vehicle. Similarly, flight controls such as a cyclic stick, collective lever, engine throttle, and yaw pedals, along with several instruments and displays, are situated in front of and next to a rotorcraft operator seated in an operational location. Overhead control panels and center consoles are within reach and in general alignment with an operator's operational position and orientation. Weapons systems, radar controls, electronic jamming equipment, and other systems are likewise positioned proximate to an operator onboard certain types of vehicles.

Intuitive and efficient arrangement of these systems around an operator is desirable for safe and comfortable operation, and efficient vehicle design. These features may be arranged into a tight, integrated package encompassing an operational location designed to minimize operator movement, attention diversion, and unnecessary vehicle weight and profile. However, ingress and egress considerations may substantially limit efficient arrangement of these systems in order to provide pathways for an operator, technician, or any other person (hereinafter "crewmember" collectively) to enter and exit a seat in a crewstation. Common crewstation access points include a side door, a center aft door or passage, and/or a side aft door or passage, depending on the type of vehicle and its particular architecture. In side door applications, crewmembers often enter a seat in the crewstation by sliding in sideways to a seat substantially fixedly oriented toward the fore end of the vehicle. In aft door or passage applications, crewmembers may ingress into the crewstation from the rear through the vehicle cabin, and negotiate a narrow passageway running alongside a seat in order to sit down. Both approaches involve a passageway next to, and sometimes substantially around, the front quarter of a seat, which a crewmember uses to ingress and egress a crewstation and sit in an operational position. Providing such a pathway can result in crewstation layouts that are uncomfortable and/or unnatural for crewmember ingress/egress and operation, in addition to increasing vehicle weight and aerodynamic profile. In many cases, crewmembers intentionally or inadvertently step over, step on, kick, lean on, or otherwise make contact with instruments, controls, or other devices when ingressing and egressing a crewstation, which can damage these systems. Such damage may lead to reduced dispatch reliability and increased in repair costs. Additionally, some crewstation layouts make it difficult for crewmembers to ingress and egress without disturbing or invading the personal zone of others seated nearby, or without requiring others to move or completely disembark the vehicle altogether.

The present disclosure is directed to a moveable seat assembly 100 that facilitates ingress to and egress from a vehicle crewstation 200, and may contribute to designs that better conform to a crewmember when seated in an operational location 126.

Ingress/Egress Travel Motion

Figure 1B:
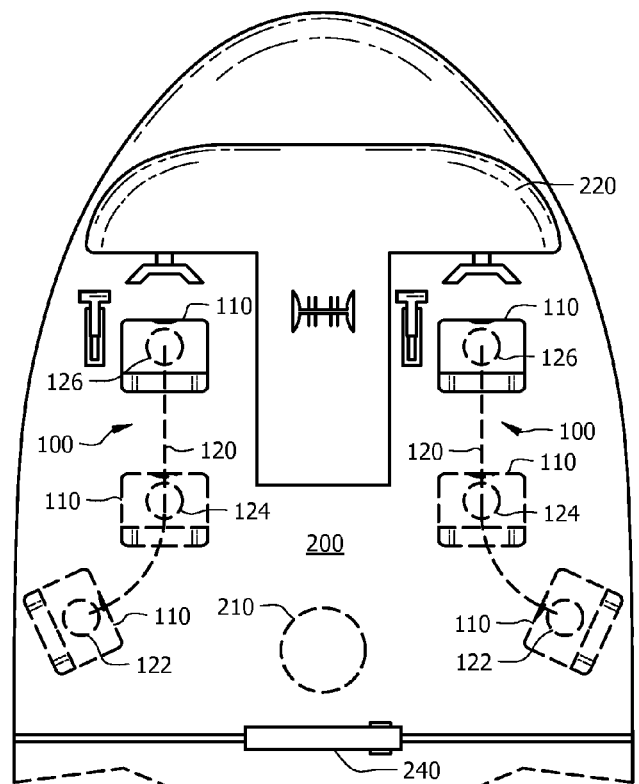
FIG. 1B depicts a top schematic view of a moveable seat assembly within a vehicle crewstation, with a center aft access point according to an embodiment of the present disclosure.
Figure 1C:
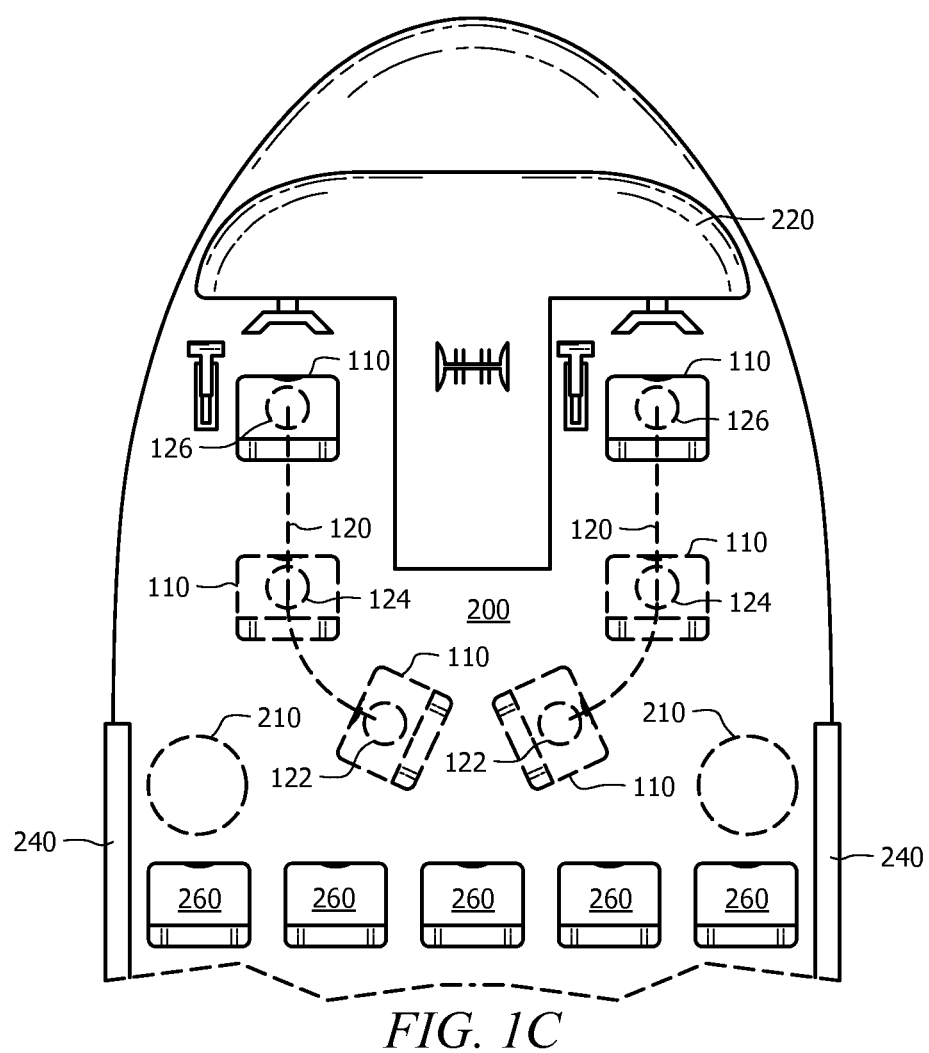
FIG. 1C depicts a top schematic view of a moveable seat assembly within a vehicle crewstation, with an off-center aft access point according to an embodiment of the present disclosure.

Referring now to FIGS. 1A-1C, a moveable seat assembly 100 is schematically depicted within a vehicle crewstation 200. The moveable seat assembly 100 may generally comprise a crewstation seat 110 and a predetermined path 120 along which the crewstation seat 110 moves. Any suitable seat 110 may be used—embodiments described herein may comprise existing or new seat designs, and some components of seat assembly 100 may be designed into the seat 110. In certain embodiments, the ends of the predetermined path 120 are generally defined by an ingress/egress location 122 proximate the crewstation access point 210 and an operational location 126 proximate vehicle controls 220. Various other locations may be identified along predetermined path 120, such as a standby location 124. In various embodiments, the predetermined path 120 may comprise straight and curved portions, and the crewstation seat 110 may be moveable rotationally as it translates along predetermined path 120. In an embodiment, the crewstation seat 110 may have a predetermined orientation at each travel position 128 along predetermined path 120 as crewstation seat 110 moves between the ingress/egress location 122 and the operational location 126. Movement along predetermined path 120 may be translational (longitudinal, lateral, vertical, or a combination thereof) and/or rotational in nature. One having ordinary skill in the art will recognize that a desired motion is specific to a given crewstation and vehicle architecture.

Crewstation access points 210 may include, but are not limited to, a side door or passage 240 as shown in FIG. 1A, a center aft door or passage 240 as shown in FIG. 1B, and/or an off-center aft door or passage 240 as shown in FIG. 1C. However, crewstation access point 210 may be positioned anywhere around the perimeter of a crewstation 200, and the location is limited only by the particular architecture of a given crewstation 200. While a crewstation 200 may commonly comprise the cockpit of a vehicle, it may alternatively comprise any other region of a vehicle in which a crewmember is situated. For example, a radar operator may sit in a separate crewstation located aft of the cockpit in an AWACS aircraft. A crewstation 200 and corresponding crewstation access point 210 need not be physically defined by structure (a door, aisle, bulkhead, etc.), but rather may comprise an area naturally used to operate a vehicle, and any location at which ingress and egress are possible, respectively. It may be advantageous to designate a crewstation access location 210 and corresponding ingress/egress location 122 that is substantially clear of obstructions, such as structure, passengers, or other crewmembers, if applicable.

In operation, crewstation seat 110 may be oriented at the ingress/egress location 122 such that a crewmember may enter and exit crewstation seat 110. Crewmember ingress and egress may be facilitated by orienting crewstation seat 110 to align somewhat naturally with the crewstation access location 210. For example, referring now to FIG. 1B, in an application where the crewstation access location 210 is located near a center-aft door 240 of a crewstation 200, an ingress/egress location 122 may be located proximate to that access location 210, and oriented substantially toward or perpendicular to (or possibly at some orientation therebetween). In another example, referring now to FIG. 1C, a crewmember might ingress/egress the crewstation 200 of a helicopter having a door-less cockpit through an off-center aft crewstation access location 210. If a crewmember were to approach crewstation access location 210 by climbing into the helicopter through a cabin side door 240, a possible ingress/egress location 122 may be proximate to this access location 210 and oriented somewhat outboard, as shown in FIG. 1C.

When crewmember enters the crewstation seat 110 via the crewstation access point 210, the crewstation seat 110 may then travel along predetermined path 120 from the ingress/egress location 122 to the operational location 126. The operational location 126 is a location proximate to vehicle controls, instruments, displays, etc. (hereinafter "controls 220" collectively). Seat 110 may be oriented at this operational location 126 in any manner conducive to operation of the vehicle or a vehicle system. In many cases, this orientation is directed toward the fore end of the vehicle such that a crewmember may view oncoming terrain, but is not limited to such an orientation. For example, a crewmember may operate a radar system in an AWACS aircraft, and the radar operator's crewstation 200 or area of a crewstation 200 may face another direction. A possible non-forward facing seat orientation in operational location 126 is certainly envisioned within the scope of this disclosure.

Predetermined travel path 120 of the crewstation seat assembly 100 may be crewstation-specific. One having ordinary skill in the art will understand that predetermined path 120 might be influenced by spatial constraints within the crewstation 200, such as avoiding crewstation controls 220 or other structure. Additionally, predetermined path 120 might avoid possible constraints near the crewstation access point 210. For example, in the door-less helicopter crewstation 200 of FIG. 1C, ingress/egress seat location 122 might be influenced by a desire to avoid crewmembers bumping the knees of passengers already seated in front row seats 260 of the helicopter cabin.

A standby location 124 may be disposed along predetermined path 120 between ingress/egress location 122 and operational location 126. In one embodiment, seat 110 may be moved to this standby location 124 after a crewmember egresses the crewstation 200. Standby location 124 may be located such that a seat 110 positioned in this location 124 would be substantially out of the way while the crewmember is outside of the crewstation 200, yet still proximate to an ingress/egress location 122 for quick access. For example, moving seat 110 to a standby position 124 would clear a space in the aft section of the crewstation 200 in the embodiment depicted in FIG. 1B, and moving seat 110 to a standby position 124 would allow passengers seated in front row seats 260 to have ample legroom while crewmember conducts duties outside of crewstation 200 in the embodiment depicted in FIG. 1C.

In an embodiment, the predetermined path 120 of moveable seat assembly 100 may comprise a somewhat curved or "j-shaped" arrangement to achieve a desired orientation of the crewstation seat 110 at the ingress/egress location 122, the operational location 126 and/or various other locations along the predetermined path 120. For example, operational location 126 may be proximate to vehicle controls 220, and predetermined path 120 may be arranged to achieve forward facing orientation of crewstation seat 110 at the operational location 126. Similarly, ingress/egress location 122 may be proximate to an outboard-aft crewstation access point 210, and predetermined path 120 may be arranged to achieve substantially outboard orientation of crewstation seat 110 at the ingress/egress location 122. Fore/aft translation of the crewstation seat 110 along a substantially straight portion of the predetermined path 120 could effectively insert/remove a crewmember from operational location 126, and combined fore/aft and lateral translation along a substantially curved portion of the predetermined path 120 could position and orient the crewstation seat 110 for easy ingress/egress near the crewstation access location 210. Such an embodiment might allow for a door-less cockpit design, and allow a crewmember to enter/exit a helicopter through a side cabin door 240, and ingress/egress the crewstation 200 therefrom, without disturbing, offending, or requiring passengers seated in front row seats 260 to move their legs or disembark the aircraft during crewmember ingress/egress. Crewstation seat assembly 100 may minimize passenger disturbance in this, or a similar manner, during pilot ingress/egress. It may also facilitate ease of crewstation ingress and egress, which may result in fewer instances of damage caused by crewmembers stepping over, stepping on, kicking, leaning on, or otherwise making contact with instruments, controls, or other devices. Further, a predetermined path 120 having smooth, continuous transitions, as opposed to an abrupt directional change like that found on an "L-shaped" track, may enable seat 110 to translate smoothly along the entirety of path 120 without major guidance or extra effort from a crewmember.

Additionally, crewstation seat assembly 100 may be designed to minimize the footprint created by any reorientation of crewstation seat 110 along path 120. By limiting the footprint of crewstation seat 110 reorientation, the crewstation 200 need not include significant lateral gaps to accommodate crewmember's knees during travel along predetermined path 120. In this manner, vehicle controls 220 and other structure may conform tightly to the sides of the crewmember in and near the operational position 126.

Adjustment Motion

Figure 2A:
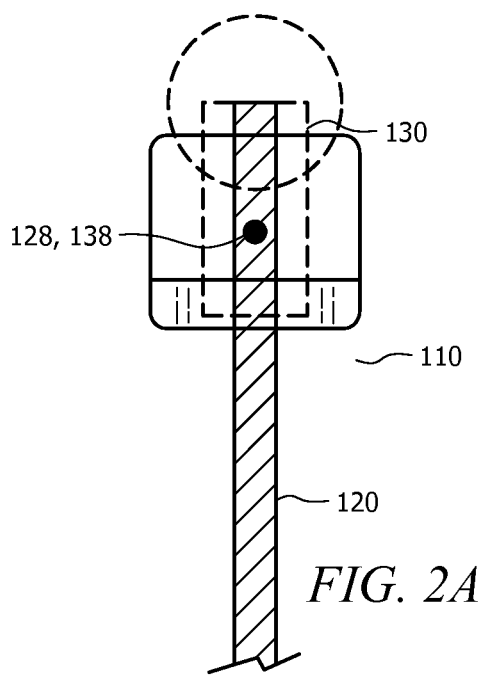
FIG. 2A depicts a top schematic view of a moveable seat assembly being adjustable to an adjustment position coinciding with travel position according to an embodiment of the present disclosure.
Figure 2B:
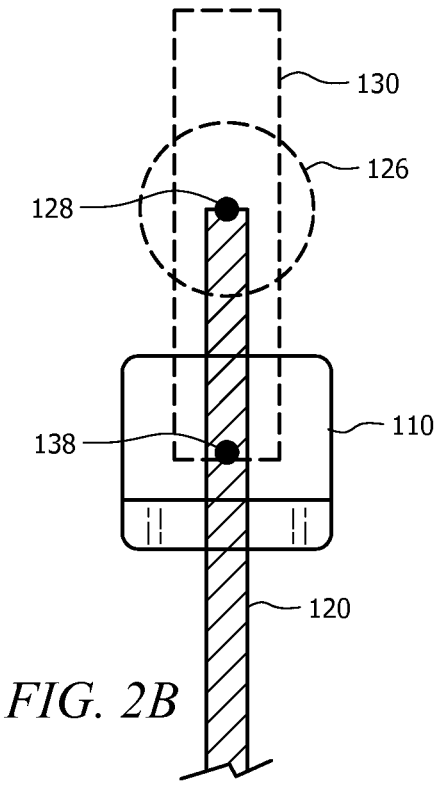
FIG. 2B depicts a top schematic view of a moveable seat assembly being separately adjustable along an adjustment path, wherein the seat is in an adjustment position possibly preferred by taller crewmembers according to an embodiment of the present disclosure.
Figure 2C:
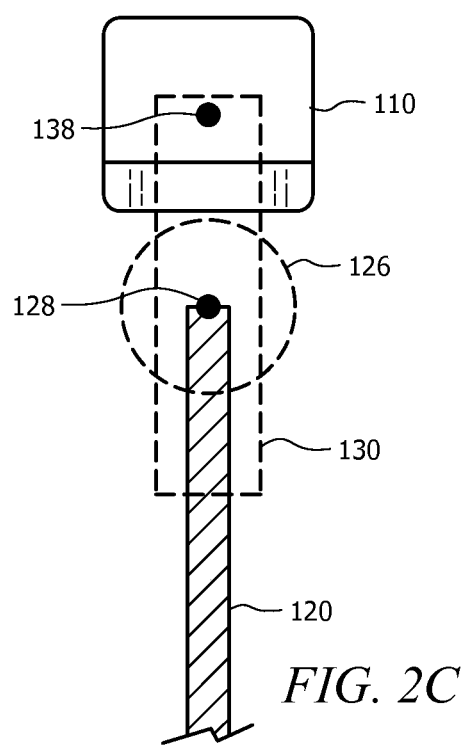
FIG. 2C depicts a top schematic view of a moveable seat assembly being separately adjustable along an adjustment path, wherein the seat is in an adjustment position possibly preferred by shorter crewmembers according to an embodiment of the present disclosure.

Referring to FIGS. 2A, 2B, and 2C, seat 110 may also have an adjustment position 138 along an adjustment path 130 in addition to having a travel position 128 along predetermined path 120. Seat 110's adjustment position 138 and travel position 128 may coincide in some cases, as shown in FIG. 2A. Seat 110 may also be adjusted separately from travel motion. In such embodiments, adjustment path 130 may move with seat 110 along predetermined path 120—that is, the position of adjustment path 130 is coupled to the travel position 128 of seat 110 along predetermined path 120. The orientation of adjustment path 130 is also fixedly coupled to the orientation of seat 110 at its travel position 128 along predetermined path 120. However, seat 100 may be adjusted to an adjustment position 138 on adjustment path 130 that is offset from travel position 128. For reference purposes, adjustment position 138 will be referenced at the center of seat 110, and travel position 128 will be referenced at the intersection of adjustment path 130 and predetermined travel path 120.

Adjustment path 130 may provide for seat 110 to be adjusted to an adjustment position 138 offset from seat 110's travel position 128. For example, a taller crewmember may prefer to be seated further from controls 220 than a shorter crewmember when seat 110 is positioned at an operational location 126. In operation, the taller crewmember may adjust seat 110 along adjustment path 130 to an adjustment position 138 located aft of travel position 128, as shown in FIG. 2B, while the shorter crewmember may adjust seat 110 along adjustment path 130 to an adjustment position 138 located forward of travel position 128, as shown in FIG. 2C.

In embodiments like that depicted in FIG. 2A, a portion of track 320 (later described) may define both adjustment path 130 and a portion of predetermined path 120. In embodiments having separate adjustability like those depicted in FIGS. 2B and 2C, adjustment path 130 may be defined by separate structure, such as seat rails 650 (later described), that allow adjustment motion to be decoupled from ingress/egress motion. In the former case, position 138 of seat 110 may be adjusted by undergoing travel motion along track 320. Here, adjustment path 130 would coincide with a portion of predetermined path 120, and adjustment position 138 would coincide with travel position 128. In the latter case, position 138 of seat 110 may be adjusted along separate structure, such as seat rails 650, that is coupled to both seat 110 and track 320. Here, adjustment along path 130 may be separate from travel motion along travel path 120. The adjustment path may still be coupled to (i.e. translate with) position 128 of seat 110, but the position 138 of seat 110 may be adjusted without necessarily changing the position 128 of seat 110.

In one embodiment, adjustment path 130 is substantially straight and remains fixedly oriented toward the fore and aft ends of seat 110. Adjustment path 130 is fixedly coupled to the travel position 128 of seat 110 along predetermined path 120—that is, adjustment path 130 moves with the travel position 128 of seat 110 along predetermined path 120. Adjustment path 130 constantly runs toward the fore and aft ends of seat 110 in this particular embodiment. In embodiments where adjustment motion may occur separate from ingress/egress motion, the seat 110 may be moved along predetermined path 120 for ingress and egress, whilst ensuring that seat 100 will remain situated in crewmember's preferred adjustment position 138 along adjustment path 130 when seat 110 is positioned at a travel position 128 coinciding with operational location 126.

Vehicle crewstation seat 110 may be moved along predetermined travel path 120 and adjustment path 130 in a variety of ways. A seated crewmember may manually move seat 110 by pushing or pulling on the floor or nearby structure with his arms or legs. A predetermined path 120 having smooth, continuous transitions, as opposed to an abrupt directional change like that found on an "L-shaped" track, may enable crewmember to translate seat 110 smoothly along the entirety of path 120 without also having to readjust and push/pull in another direction on crewstation structure. Similarly, an optional motor may propel seat assembly 100, much like power seats in a car. Motor may be used to assist in both ingress/egress travel motion and adjustment motion. Crewmember may operate motor using manual controls, or the motor may comprise programmable buttons to "remember" preferred seat positions 138 for various crewmembers. Motor actuation may also be triggered by a signal, such as one generated by opening or closing a door 240. Motor may have a manual override to allow seat motion in the even of motor failure. Vehicle crewstation seat assembly 100 may also comprise a spring-loaded or similar stored-energy mechanism to assist in moving seat 110 along predetermined path 120. For example, a spring may be used to pull seat 110 to a standby location 124 after a crewmember egresses the crewstation 200, thereby moving seat 110 out of the way while crewmember performs duties outside of the crewstation 200. Crewmember could subsequently return seat 110 to an ingress/egress location 122 from standby location 124 when he/she is ready to ingress the crewstation 200. A predetermined path 120 having smooth, continuous transitions may better enable an assistive device 840 to push/pull seat 110 along the entirety of path 120, without requiring additional guidance input from a crewmember. One having ordinary skill in the art will recognize that any number of methods and assistive devices may be employed to effect travel of seat 110 in seat assembly 100, and that the present disclosure is not limited to these examples.

Mechanical Embodiments

Moveable seat assembly 100 may comprise any construction operable to move the crewstation seat 110 along predetermined path 120 as previously described. In each of the embodiments described herein, seat motion is effected by mechanisms separate from the seat 110. As such, One having ordinary skill in the art will recognize that such construction may be achieved in numerous ways, and will understand that the present disclosure is not limited to the following embodiments.

Figure 3A:
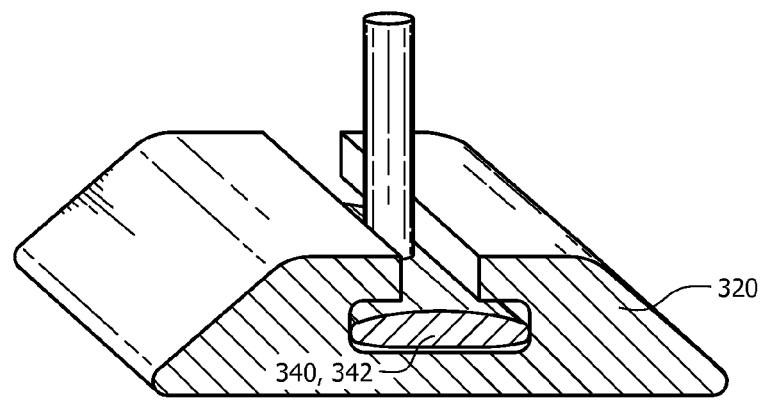
FIG. 3A depicts a perspective cross-sectional view of a limited orientation track/coupler assembly according to an embodiment of the present disclosure.
Figure 3B:
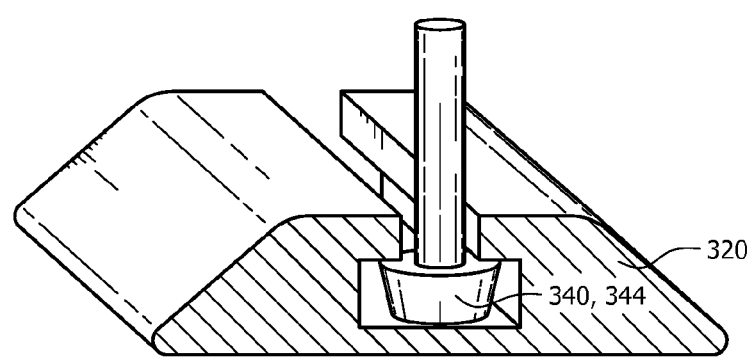
FIG. 3B depicts a perspective cross-sectional view of a free orientation track/coupler assembly according to an embodiment of the present disclosure.
Figure 3C:
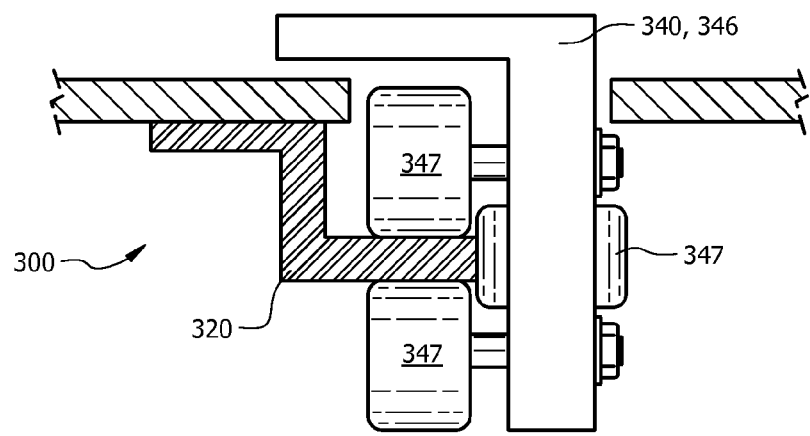
FIG. 3C depicts a side cross-sectional view of a glide type track/coupler assembly according to an embodiment of the present disclosure.

In various embodiments, travel of the crewstation seat 110 along predetermined path 120 may be accomplished using track/coupler assemblies 300, such as those depicted in FIGS. 3A, 3B, and 3C. In particular, crewstation seat 110 may be coupled by a coupling mechanism 340 directly or indirectly to one or more guiding structures that may include, but are not limited to tracks, rails, bars, conduits, and the like (hereinafter "tracks 320" collectively). One skilled in the art will recognize that any suitable coupling mechanism 340 may be used to couple crewstation seat 110 to tracks 320.

Referring now to FIG. 3A, in one embodiment, the coupling mechanism 340 may comprise a limited orientation type coupler 342 that orients any structure of the seat 110 coupled to the coupler 342 substantially tangential to tracks 320. For example, the limited orientation type coupler 342 may comprise an "I-beam" coupler that couples crewstation seat 110 (or intermediate structure) to a recessed "I-beam" type track 320, as shown in FIG. 3A.

Referring now to FIG. 3B, in another embodiment, coupling mechanism 340 may comprise a free orientation type coupler 344 that enables any structure of the seat 110 coupled to the coupler 344 to orient in alternative directions relative to tracks 320. For example, the free orientation type coupler 344 may comprise a rounded coupler that couples crewstation seat 110 (or intermediate structure) to any suitable recessed track 320, as shown in FIG. 3B. Rounded coupler 344 may permit rotational motion of structure coupled thereto.

Referring now to FIG. 3C, in yet another embodiment, coupling mechanism 340 may comprise a glide-type coupler 346 that enables any structure of the seat 110 coupled thereto to translate along tracks 320, as shown in FIG. 3C. A glide-type coupler 346 may comprise a series of bearings 347 or similar mechanisms known in the art to secure glide-type coupler 346 to track 320 and provide for translation along track 320. These track/coupler assembly 300 embodiments are understood to be for illustrative purposes only, and do not limit the present disclosure to only these embodiments. Further, the motion of crewstation seat assembly 100 is not limited to embodiments using track/coupler assemblies 300.

Reorientation Via Track Only

Figure 4A:
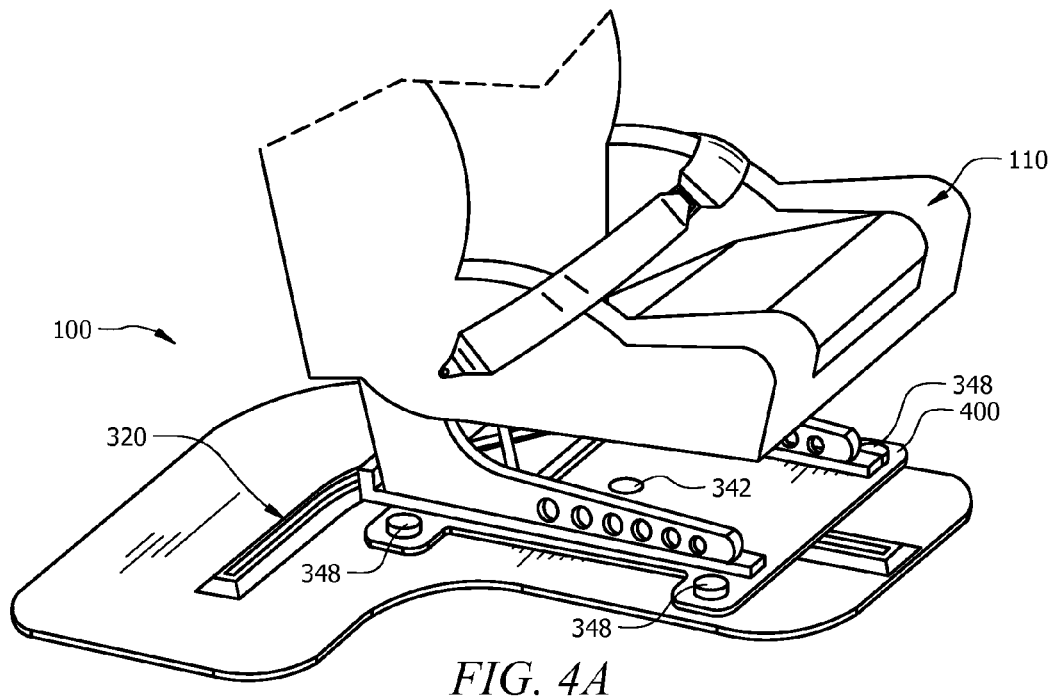
FIG. 4A depicts a perspective view of a moveable seat assembly coupled to a track defining a predetermined path according to an embodiment of the present disclosure.
Figure 4B:
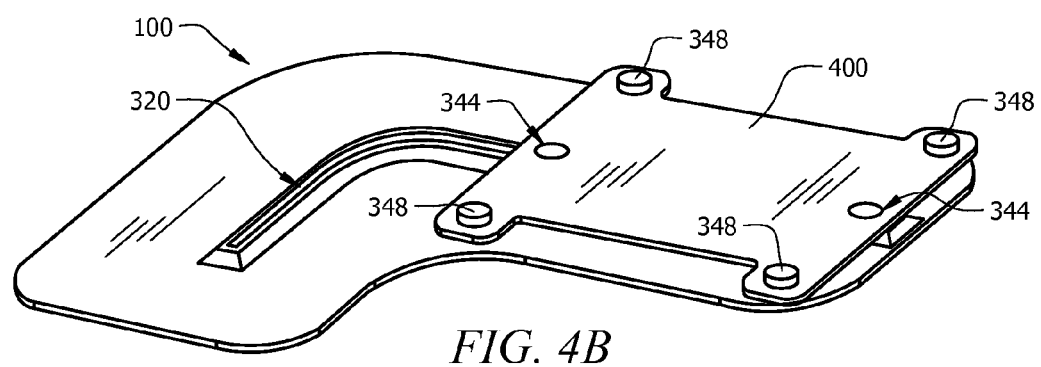
FIG. 4B depicts a perspective view of a mounting plate of a moveable seat assembly coupled to a track using free orientation type couplers according to an embodiment of the present disclosure.
Figure 4C:
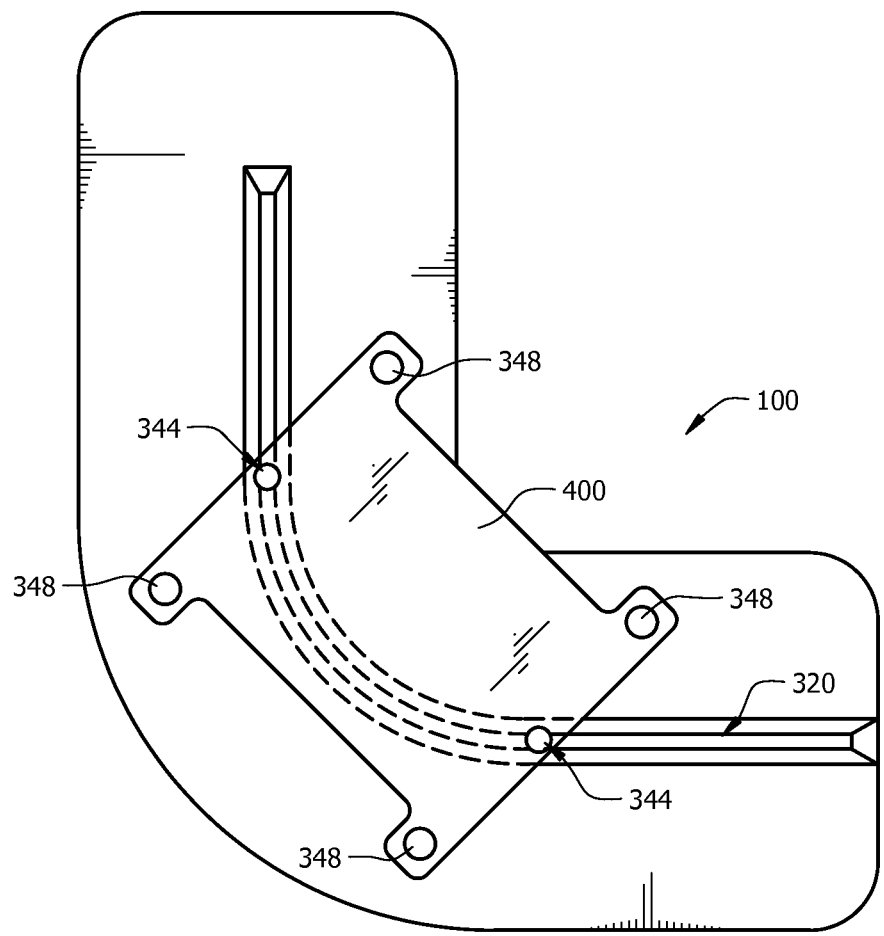
FIG. 4C depicts another perspective view of the mounting plate of FIG. 4B moved along the track to a different position and orientation according to an embodiment of the present disclosure.

Referring now to FIGS. 4A, 4B, and 4C, in one embodiment, movable seat assembly 100 comprises a crewstation seat 110, a mounting plate 400, and one or more track/coupler assemblies 300 wherein the tracks 320 define a predetermined path 120, an ingress/egress location 122, and an operational location 126. Seat 110 may couple directly to mounting plate 400, or may adjustably couple one or more seat rails 650 which are fixedly coupled to mounting plate 400. Mounting plate 400 may be constructed of any suitable rigid material and is sized to accommodate seat 110. The mounting plate 400 and any seat rails 650 may be of sufficient strength to comply with any pertinent standards governing airworthiness, crashworthiness, etc., such as FAR Parts 29.561, 29.562, and 29.785 in an example rotorcraft context. Commercial-off-the-shelf casters 348 may be coupled to underside of mounting plate 400 for smooth translation along a floor.

Referring to FIG. 4A, mounting plate 400 may be coupled to tracks 320 using a coupling mechanism 340, such as a limited orientation type coupler 342. This arrangement may provide for both translation and possible reorientation of the mounting plate 400 along predetermined path 120 due to the structure of the tracks 320. In particular, because a limited orientation type coupler 342 maintains the orientation of mounting plate 400 to remain substantially tangential to the tracks 320 during translation, any curvature in the tracks 320 may impart a change in orientation to mounting plate 400, and thereby seat 110. One having ordinary skill in the art will recognize that any curvature in tracks 320 may be gradual, and of substantial radius, to allow a limited orientation type coupler 342 to translate without getting stuck within tracks 320.

Referring now to FIGS. 4B and 4C, mounting plate 400 is shown coupled to tracks 320 by a plurality of coupling mechanisms 340, with the mounting plate 400 shown in one orientation while positioned in a travel position 128 in the operational location 126 and with the mounting plate 400 shown in another orientation while positioned in a travel position 128 in the ingress/egress location 122. In this arrangement, the mounting plate 400 is free to deviate from an orientation tangential to tracks 320 as it travels a curved path between the operational location 126 and the ingress/egress location 122.

During flight operations, crewstation seat may be locked into an operational location 126 using a seat retention system 800 (later described). During crewmember ingress/egress, the seat retention system may be disengaged, allowing the mounting plate 400 to move along a predetermined path 120 between the operational location 126 and the ingress/egress location 122. During egress, for example, the mounting plate 400 may translate aft along a straight section of the track(s) 320. When the mounting plate 400 reaches the end of the straight section(s), it may continue to follow a curved section(s) to the end. Rotation of the mounting plate 400 may be effected solely by translational movement of the plate 400 along the track(s) 320. Mounting plate 400 may continue to follow predetermined path 120 until the ingress/egress location 122 is reached. Motion of the crewstation seat assembly 100 follows a reverse of this path during ingress operations.

Reorientation Via Track and Pivot Point

Figure 5A:
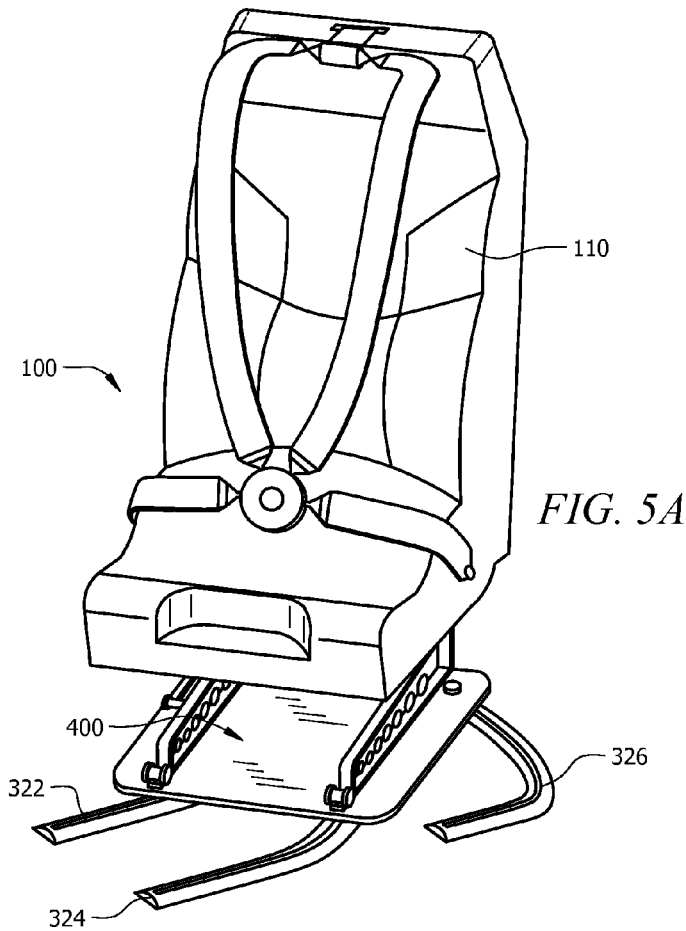
FIG. 5A depicts a perspective view of a moveable seat assembly coupled to a track and using a pivot point according to an embodiment of the present disclosure.
Figure 5B:
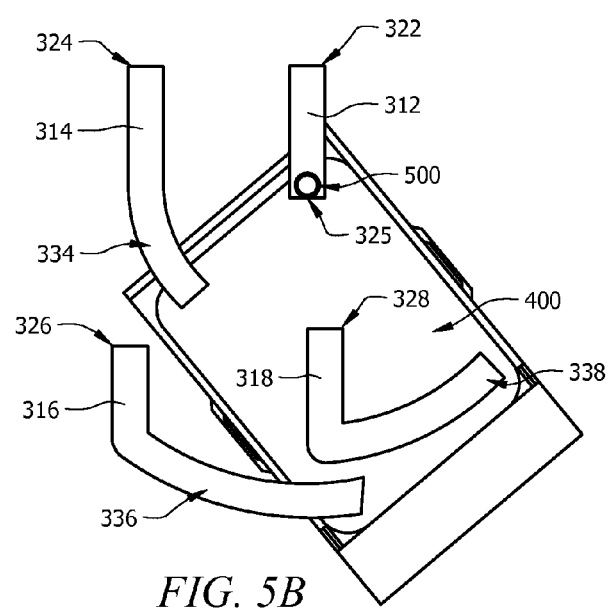

FIGS. 5A and 5B depict a perspective view and a bottom view, respectively, of another embodiment of moveable seat assembly 100 comprising a crewstation seat 110, a mounting plate 400, and tracks 320 comprising a plurality of segments 322, 324, 326, 328, as best shown in FIG. 5B. Seat 110 may couple directly to mounting plate 400, or may adjustably couple one or more seat rails 650 which are fixedly coupled to mounting plate 400. Mounting plate 400 may be constructed of any suitable rigid material and is sized to accommodate seat 110. The mounting plate 400 may be sufficient in strength to comply with any pertinent standards governing airworthiness, crashworthiness, etc., such as FAR Parts 29.561, 29.562, and 29.785 in an example rotorcraft context. Seat 110 may be coupled to mounting plate 400 by any suitable connection mechanism known in the art. As shown in FIGS. 5A and 5B, mounting plate 400 may be coupled to each segment 322, 324, 326, 328 of tracks 320 using any coupling mechanism 340 known in the art that allows for translation along the tracks 320.

First track segment 322 comprises a substantially straight portion 312 having a first end and a second end with an endstop 325 at the second end defining a pivot point 500. Each of the other track segments 324, 326, 328 comprises a straight portion 314, 316, 318, which extends from a first end and is equal in length to the first track segment 322. Each of the other track segments 324, 326, 328 further comprises a curved portion 334, 336, 338 of varying length and radii, which extends from the straight portion 314, 316, 318 to a second end. All track segments 322, 324, 326, 328 are arranged such that the straight portions 312, 314, 316, 318 of each are parallel. As depicted, the first track segment 322, comprising only a straight portion 312, may be situated at a forward corner of the seat assembly 100.

During flight operations, crewstation seat 110 may be locked into an operational location 126 using a seat retention system 800 (later described). During ingress/egress operations, the seat retention system may be disengaged, allowing the mounting plate 400 to move along a predetermined path 120 between the operational location 126 and the ingress/egress location 122. During egress, for example, the mounting plate 400 may translate aft along the straight portions 312, 314, 316, 318 of the track segments 322, 324, 326, 328. When the mounting plate 400 reaches the end of the straight portions 312, 314, 316, 318, the endstop 325 of track segment 322 creates a pivot point 500 about which the mounting plate 400 will rotate according to the path defined by the curved portions 334, 336, 338 of the other track segments 324, 326, 328. Unlike in the previous embodiments, where translation along the tracks 320 is used to effect orientation of the mounting plate 400, in this embodiment, the mounting plate 400 is oriented by translational movement of the mounting plate 400 along curved portions 334, 336, 338 of track segments 324, 326, 328 about a pivot point 500. Indiscriminate rotation of the mounting plate 400 is thereby prevented because the tracks 320, couplers 340, and mounting plate 400 work together. Mounting plate 400 may continue to traverse this path along tracks 320 until the ingress/egress location 122 is reached. Motion of the crewstation seat assembly 100 follows a reverse of this path during ingress operations.

Figure 6A:
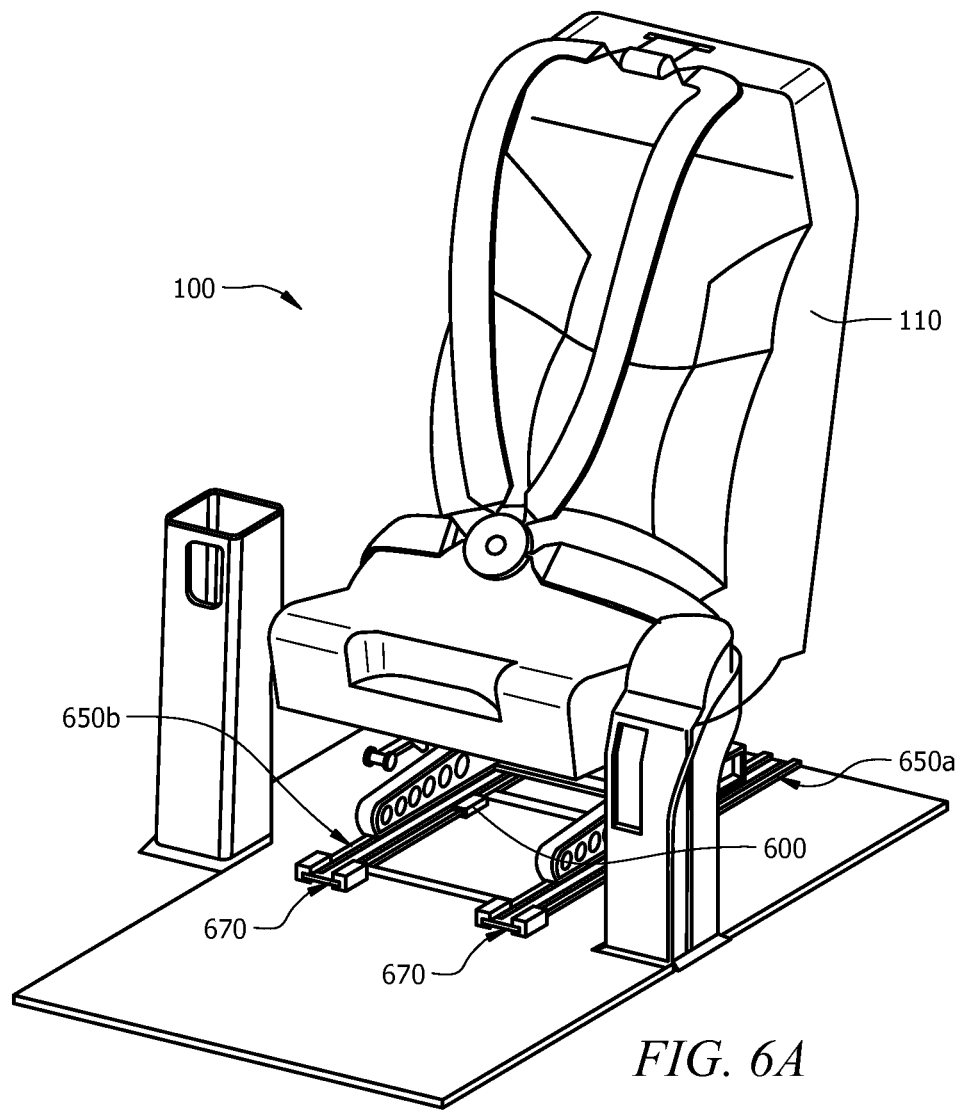
FIG. 6A depicts a perspective view of another moveable seat assembly coupled to a track and using a pivot point according to an embodiment of the present disclosure.
Figure 6B:
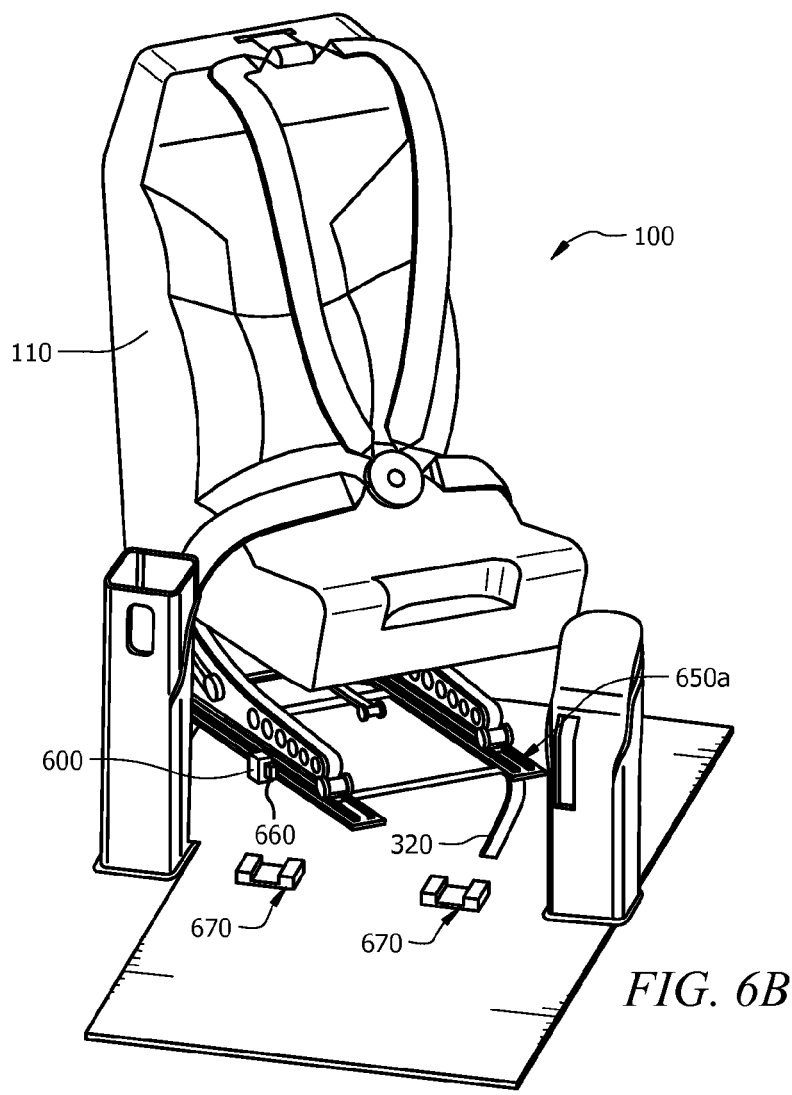
FIG. 6B depicts another perspective view of the moveable seat assembly of FIG. 6A moved along the track to a different position and orientation according to an embodiment of the present disclosure.
Figure 6C:
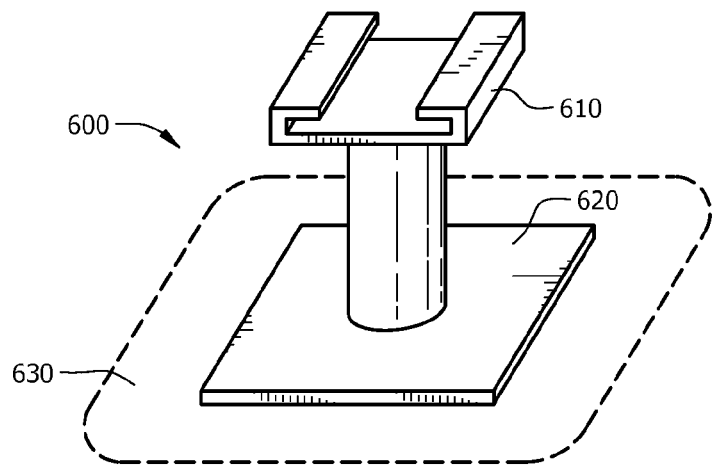
FIG. 6C depicts a perspective view of a pivot mechanism according to an embodiment of the present disclosure.

FIGS. 6A and 6B depict another embodiment of moveable seat assembly 100 comprising crewstation seat 110, sliding seat rails 650, tracks 320, and pivot mechanism 600, shown in more detail in FIG. 6C. Seat rails 650, such as first seat rail 650A and second seat rail 650B, are used to provide a support for the crewstation seat 110, and may be separate or connected to each other as part of a monolithic structure. While two seat rails 650 are described herein, any suitable number of rails 650 may be used in other embodiments of the present disclosure. Seat rails 650 may be spaced apart to correspond with crewstation seat 110 mounting hardware, and rails 650 may define an adjustment path 130, providing for crewstation seat 110 to be adjusted to an adjustment position 138 for comfort thereon. In an embodiment, seat rails 650 are compliant with a seat design standard, such as AS33601.

A first seat rail 650A may be coupled to a track 320 using a coupling mechanism 340. The track 320 may be of any suitable shape and construction, and defines a path of travel for the first seat rail 650A. One having ordinary skill in the art will recognize a suitable track 320 shape to effect desired motion. First seat rail 650A may be coupled to track 320 using any suitable coupling mechanism 340 known in the art that allows for translation along the track 320. In one embodiment, first seat rail 650A is coupled to track 320 with a glide type coupler 346.

A second seat rail 650B may be slidably coupled to a pivot mechanism 600, such as a pivot glide, as shown in more detail in FIG. 6C. The pivot glide 600 may comprise a sliding component 610 to which the second seat rail 650B is slidably coupled, using a series of bearings or a similar mechanism known in the art. Sliding component 610 may be rotatably connected to a base member 620 along a vertical axis, and base member 620 may be fixedly connected to supporting structure, such as the vehicle floor 630.

During flight operations, crewstation seat 110 may be locked into an operational location 126 using a seat retention system 800 (later described). During ingress/egress operations, seat retention system may be disengaged, allowing the seat rails 650A, 650B to move along a predetermined path 120 between the operational location 126 and the ingress/egress location 122. During egress, for example, seat rails 650A, 650B may translate aft, with first rail 650A following a straight portion of track 320, and second rail 650B forced to slide through pivot glide 600 in the same direction. A stop 660 may be installed on second seat rail 650B at a predetermined location to stop translational movement of second seat rail 650B through pivot glide 600. The location of stop 660 on second seat rail 650B may be chosen such that stop 660 engages pivot glide 600 at the same time glide type coupler 346 enters a curved portion of track 320. When seat rails 650A, 650B reach this point, first seat rail 650A may follow a curved portion of track 320, and second seat rail 650B may rotate on pivot glide 600, effectively reorienting seat 110. Indiscriminate rotation of seat rails 650A, 650B is prevented because glide type coupler 346 and pivot glide 600 work together. Seat rails 650A, 650B may continue this predefined motion until the ingress/egress location 122 is reached. Mechanisms including, but not limited to, casters, may be used to support the rear of seat rails 650, allowing seat rails 650 to move free of obstructions on a vehicle floor 630. Motion of the crewstation seat assembly 100 follows a reverse of this path during ingress operations.

In this embodiment, the forward ends of seat rails 650A, 650B may slip into forward seat rail retainers 670 that restrain upward, downward, forward, and lateral degrees of freedom. Forward retainers 670 and seat retention system 800 (later described) may firmly fix seat rails 650 in place when used together. The seat rails 650 may be of sufficient strength to comply with any pertinent standards governing airworthiness, crashworthiness, etc., such as FAR Parts 29.561, 29.562, and 29.785 in an example rotorcraft context.

Figure 7:
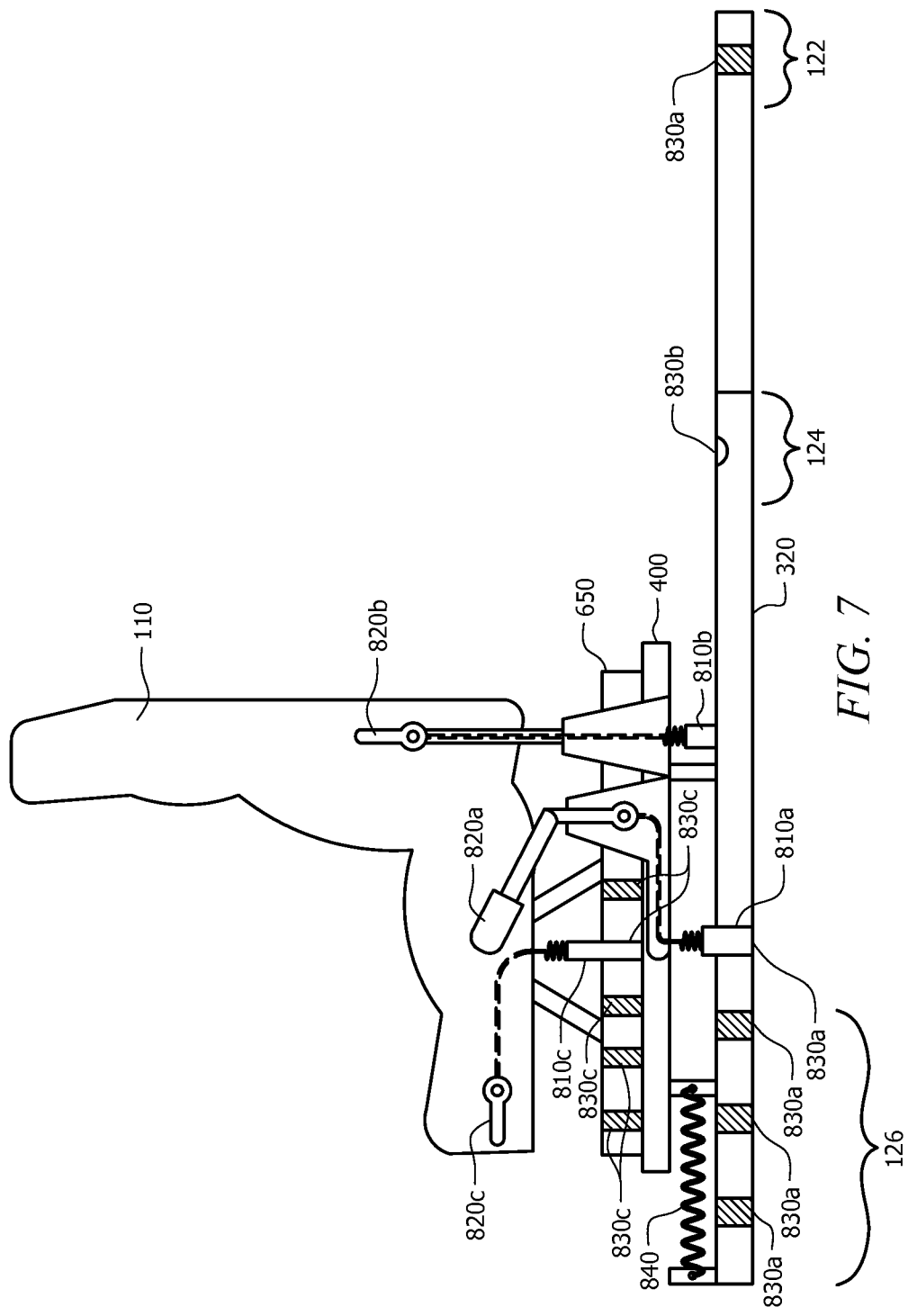
FIG. 7 depicts a side view of a seat retention system comprising three locking mechanisms according to an embodiment of the present disclosure.

Referring now to FIG. 7, seat 110 may be locked into a variety of travel positions 128 along predetermined path 120 using a seat retention system 800. Retention system 800 may comprise one or more releasable locking mechanisms 810 known in the art, such as a locking pin. Each of locking mechanisms 810 may be coupled to an engage/disengage mechanism 820, such as a release handle. Engage/disengage mechanisms 820 may be located in any convenient location, such as beside the base portion of seat 110 or along the side of the back portion of seat 110. Track 320 and seat rails 650 may comprise locking mechanism receivers 830, such as holes or detents in the structure. Locking receivers 830 may be distributed in any number and frequency along all or a portion of tracks 320 and seat rails 650, and may defined possible locations in which a crewmember may wish to lock the seat in place. For example, one or more locking receivers 830 may be situated proximate to ingress/egress location 122, standby location 124, and operational location 126.

Seat assembly 100 may include a seat retention system 800 comprising multiple separate locking mechanisms 810—one or more for locking seat 110 in a travel position 128 along predetermined path 120, and one or more for locking seat 110 in a separate adjustment position 138 along adjustment path 130. Each locking mechanism 810 may have its own engage/disengage mechanism 820, and operation of engage/disengage mechanisms 820 may be coupled or separate. Retention system 800 may work in concert with assistive mechanisms 840 like springs, stored-energy devices, and motors described previously herein.

In one embodiment, moveable seat assembly 100 may include a seat retention system 800 comprising three locking mechanisms 810 and three engage/disengage mechanisms 820, and as shown in FIG. 7. A first spring-loaded locking pin 810a may be coupled to a first spring-loaded handle 820a located beside the base portion of seat 110. Track 320 may comprise a series of receiver holes 830a disposed proximate to operational position 126, as well as one or more receiver holes 830a disposed proximate to ingress/egress position 122. A seated crewmember may use first mechanisms 810a and 820a to lock/unlock seat 110 into/from receiver holes 830a along predetermined path 120. The series of receiver holes 830a located proximate to operational location 126 may serve to identify various adjustment positions 138 that coincide with associated travel positions 128.

A second spring-loaded locking pin 810b may be coupled to a second spring-loaded handle 820b located alongside the back portion of seat 110 in the embodiment of FIG. 7. Second mechanisms 810b and 820b work in a similar manner as first mechanisms 810a and 820a, but may be used by a crewmember that is not seated in seat 110. Second handle 820b may operate locking pin 810b, or both locking pins 810a and 810b, allowing crewmember to move seat 110 from behind. Track 320 may further comprise one or more receiver detents proximate to a standby location 124. Seat 110 may be locked into this location to stow seat 110 in a ready, yet out of the way position, while crewmember performs duties outside of crewstation 200. A spring 840 may be coupled to seat 110 and structure proximate to operational location 126 such that seat 110 is pulled along predetermined path 120 toward operational location 126 when seat 110 is not locked in place. In operation, a seated crewmember could move the seat 110 to an ingress/egress location 122, lock the seat 110 in place using seat retention system 800, dismount seat 110, and disengage handle 820b, thereby allowing spring 840 to pull seat 110 along predetermined path 120, where either of spring-loaded locking mechanisms 820a or 820b may automatically lock seat 110 into detent receiver 830b at the standby position 124.

A third spring-loaded locking pin 810c may be coupled to a third spring-loaded handle 820c located beside or under the front of seat 110 in the embodiment of FIG. 7. Third mechanisms 810c and 820b work in a similar manner as first and second mechanisms 810a, 820a, 810b, and 820b, and are used in this embodiment to separately adjust the adjustment position 138 of seat 110 along adjustment path 130 defined by seat rails 650.

One having ordinary skill in the art will recognize that seat retention system 800 may comprise any number and combination of locking mechanisms 810, engage/disengage mechanisms 820, and lock receivers 830. The particular embodiments described herein merely describe possible arrangements to illustrate how seat retention system may be used to lock seat 110 in various positions 128 and 138.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A movable seat assembly for a vehicle, the moveable seat assembly comprising:
    a first and second predetermined paths located on a floor of the vehicle, each having an operational location at a first end, and an ingress/egress location at a second, the first and second predetermined paths being substantially adjacent in position and substantially mirrored in orientation;
    a first and second seats that travel along the first and second predetermined paths, respectively, between the operational location and the ingress/egress location;
    wherein each of the first and second seats has an operational orientation at the operational location of its respective predetermined path, and an ingress/egress seat orientation at the ingress/egress location of its respective predetermined path; each ingress/egress seat orientation being substantially angled relative to its respective operational seat orientation;
    wherein at least one of the first and second predetermined paths comprises a substantially straight track and two or more other tracks each having a curved portion;
    a mounting plate provided to translate aft along the substantially straight track during egress; and
    an end of the substantially straight track including an endstop, the endstop defining a pivot point about which the mounting plate rotates according to a path defined by the two or more other tracks each having a curved portion.

2. The moveable seat assembly according to claim 1, wherein each seat may travel along a respective separate adjustment paths.

3. The moveable seat assembly according to claim 1, further comprising a seat retention system to lock each seat into a position and orientation along its respective predetermined path.

4. The moveable seat assembly according to claim 1, further comprising a travel assistance mechanism to assist in translating each seat between its respective operational location, and its respective ingress/egress location.

5. A moveable seat assembly for a vehicle, comprising:
a first track located on a floor of the vehicle configured to define a predetermined seat travel path between an operational location and an ingress/egress location,
a seat coupled to and moveable along the track, and configured to travel along the predetermined seat travel path between the operational location and the ingress/egress location;
wherein the seat has an operational orientation at the operational location and an ingress/egress seat orientation at the ingress/egress location; the ingress/egress seat orientation being substantially angled relative to the operational seat orientation;
wherein the predetermined seat path comprises a first track and a plurality of other tracks each having a curved portion;
a mounting plate provided to translate aft along the first track having a straight portion during egress; and
an end of the first track including an endstop, the endstop defining a pivot point about which the mounting plate rotates according to another path defined by at least three curved tracks of the plurality of other tracks.

6. The moveable seat assembly according to claim 5, wherein the seat is reoriented during translation along at least one curved track of the at least three curved tracks, and wherein the seat is rotationally reoriented about the pivot point during translation along the at least one curved track.

7. The moveable seat assembly according to claim 6, wherein the seat is coupled to the first track by a limited rotation type coupler.

8. The moveable seat assembly according to claim 6, wherein the seat is coupled to the first track by a plurality of free orientation type couplers.

9. The moveable seat assembly according to claim 6, wherein the seat is slidably coupled to a pivot mechanism at the pivot point.

10. The moveable seat assembly according to claim 9, wherein the seat comprises a first seat rail that is slidably coupled to the pivot mechanism at the pivot point, and a second seat rail that is slidably coupled to the first track.

11. The moveable seat assembly according to claim 10, wherein the second seat rail is slidably coupled to the first track by a glide-type coupler.

12. The moveable seat assembly according to claim 10, wherein the position of the seat is slidably adjustable on the first and second seat rails.

13. The moveable seat assembly according to claim 5, further comprising a seat retention system to lock the seat into a position and orientation along the predetermined path.

14. The moveable seat assembly according to claim 13, wherein the seat retention system may be selectively operated from a seated position, a location next to the seat, or a location behind the seat.

15. The moveable seat assembly according to claim 5, further comprising a travel assistance mechanism to assist in translating the seat along the predetermined path.

16. The moveable seat assembly according to claim 15, wherein the travel assistance mechanism is selected from the group consisting of: a spring-type mechanism, an electric mechanism, a hydraulic mechanism, a pneumatic mechanism, a magnetic mechanism, an electro-hydraulic mechanism, an electro-pneumatic mechanism, or an electro-magnetic mechanism.

17. A moveable seat assembly for a vehicle, comprising:
a substantially straight track and two or more other tracks located on a floor of the vehicle each having a substantially straight portion and a curved portion, the tracks configured to define a predetermined seat travel path between an operational location and an ingress/egress location;
a seat coupled to and moveable along the tracks, and configured to travel along the predetermined seat travel path between the operational location and the ingress/egress location;
wherein the seat is configured to translate along the substantially straight track and along the straight portions of the two or more other tracks and is rotationally reoriented about a pivot point on the substantially straight track during translation along the curved portions of the two or more other tracks;
a mounting plate provided to translate aft along a straight track segment of the substantially straight track; and
an end of the straight track segment including an endstop, the endstop defining a pivot point about which the mounting plate rotates according to a path defined by at least three curved track segments of the two or more other tracks.

18. The moveable seat assembly according to claim 17, further comprising a seat retention system to lock the seat into a position and orientation along the predetermined path.

19. The moveable seat assembly according to claim 18, wherein the seat retention system may be selectively operated from a seated position, a location next to the seat, or a location behind the seat.

20. The moveable seat assembly according to claim 17, further comprising a travel assistance mechanism to assist in translating the seat along the predetermined path.

21. The moveable seat assembly according to claim 20, wherein the travel assistance mechanism is selected from the group consisting of: a spring-type mechanism, an electric mechanism, a hydraulic mechanism, a pneumatic mechanism, a magnetic mechanism, an electro-hydraulic mechanism, an electro-pneumatic mechanism, or an electro-magnetic mechanism.

* * * * *